United States Patent Office 3,320,128
Patented May 16, 1967

3,320,128
DX27 ANTIBIOTIC AND ITS PRODUCTION
Annie (Boussac) Aubriot, Paris, France, assignor to Société Anonyme l'Industrie Biologique Francaise, Gennevilliers, France
No Drawing. Filed Dec. 13, 1963, Ser. No. 330,238
4 Claims. (Cl. 167—65)

The present invention relates to the novel antibiotic DX27 and its preparation and more particularly to a microbiological process for producing said antibiotic by aerobic cultivation of *Streptomyces gabonae* sp. Aubriot 272 (ATCC accession No. 15,282). The antibiotic DX27 has been obtained in a crystalline state after purification from the culture of an actinomycete isolated from a sample of Gabon earth known as Aubriot 272. The new antibiotic exhibits good antibiotic properties against various gram-positive and gram-negative organisms and is also characterized by antiviral activity.

The new antibiotic DX27 is produced by inoculating a nutrient medium with *Streptomyces gabonae* sp. Aubriot 272, cultivating the inoculated nutrient medium under aerobic conditions at a temperature in the range of 28° C. to 30° C. for 50 to 118 hours and then separating the new antibiotic from the culture medium. The cultivation is preferably carried out in the submerged state utilizing an aqueous nutrient medium containing a proteinaceous material and a source of assimilable carbon.

The new antibiotic DX27 is a basic chemical compound with the empirical formula $C_{32}H_{41}O_6N_2S$ melting at 212° C. to 215° C. in the crystalline state and having a molecular weight of about 590. It is further characterized by an optical rotation in benzene of about $(\alpha)j = 72°$ C., by ultraviolet absorption maxima at 210 and 360 m$\mu$ in a sodium phosphate buffer solution of pH 7.8, a positive biuret test for polypeptidic linkage, a negative ninhydrin test for $\alpha$-amino acid and a negative Fehling for aldehydic carbohydrates. The new antibiotic possesses inhibitory activity against *Streptococcus hemolyticus, Escherichia coli, Salmonella paratyphi B, Staphylococcus albus, Staphylococcus aureus, Klebsiella pneumoniae, Mycobacterium tuberculosis* and foot and mount virus disease. The antibiotic is soluble in aqueous alkali, slightly soluble in water of pH 6 at 70° C., soluble in $C_4$ to $C_8$ aliphatic alcohols in its non-salt acid form and extractable by n-butanol in its acid form and soluble in methanol in alkali salt form. The extraction by n-butanol is carried out in counter-flow by conventional fractionating techniques. From its methanolic solution in alkali salt form it can be precipitated by 12 volumes of acetone in the cold ($-10°$ C.).

The inhibitory power of the new antibiotic DX27 is set forth in the following table which indicates inhibition of the designated microorganisms in the designated concentrations (broth method):

*Streptococcus hemolyticus*—1.2 mcg./ml.
*Escherichia coli*—5.5 mcg./ml.
*Mycobacterium tuberculosis*—(bovine variety) 90 mcg./ml.
*Salmonella parathyphi* B—2 mcg./ml.
*Staphylococcus albus*—0.4 mcg./ml.
*Staphylococcus aureus*—0.9 mcg./ml.
*Klebsiella pneumoniae*—10 mcg./ml.

It has been found that the culture juices also have antibiotic properties which, however, are not identical with those of crystalline DX27. These culture juices of Aubriot 272 partially purified by extraction with butanol in counterflow in an acid medium and followed by extraction in an aqueous medium of pH 8 followed by lyophilization, even though somewhat impure, exhibit antibiotic activity against the above-enumerated microorganisms almost equal to that of DX27 itself. All preparations obtained from the culture juices of Aubriot 272, like crystalline DX27, possess inhibitory properties with respect to the development in vivo of certain viruses such as those of foot and mouth disease. These antiviral properties are not limited to DX27 alone because the liquid from which DX27 is crystallized still retains strong antiviral activity after the separation therefrom of the DX27. The antiviral properties have been demonstrated on guinea pigs inoculated with the virus of foot and mouth disease and of cultures in vitro of this virus carried out in conventional manner on the epithelium of the tongue of cattle. Both as to antibiotic properties and as to chemical characteristics and method of preparation, antibiotic DX27 has been found to be different from all hitherto known antibiotics.

The stability of DX27 and culture juices of Aubriot 272 have been studied under various conditions. It seems likely that there is more than one antibiotic substance present. In aqueous alkaline solution of pH 9 and at a temperature of 45° C., DX27 has been found to be stable in that it loses less than 10 percent of its activity against *Staphylococcus aureus* in twenty-four hours. The culture juices, however, are less stable under the same conditions and have been found to lose about 29 percent of their activity. At pH 2, DX27 slowly loses its activity to the extent of 10 percent in two hours at 45° C. and 22 percent in three days. Under the same conditions the culture juices lose 25 percent of their activity in the first twenty-five hours and 15 percent in the following three days. The activities were measured against *Staphylococcus aureus* and *Escherichia coli*. The antiviral properties appear to be sensitive to the action of heat irrespective of pH value. For example, at 80° C. there is a serious loss of activity and at the end of sixty-four hours there is nearly a total loss of activity. In the dry state after lyophilization, the stability is excellent and no appreciable loss of activity has been observed even after a period of six months.

Toxicity studies have been carried out on mice by the intraperitoneal method. The LD50 of DX27 on mice weighing 20 grams is 150 milligrams per kilogram of body weight. The toxicity of the culture juices has been found to be eight to ten times higher.

The strain of actinomycete cataloged under the reference Aubriot 272 was discovered in a sample of Gabon earth. Cultures of this actinomycete were obtained by artificial selection by adding a soil sample containing the said actinomycete to cultures on a nutrient medium of each of the bacteria inhibited by DX27. After incubation of these bacterial preparations at 37° C. for fifteen days a second generation of bacteria is sown from the cultures by the method of cross-selection, each new fully developed bacterial culture being sown from a culture of another species of bacteria. In this way, colonies of the new actinomycete were developed. After selection of the colonies and isolation as a pure culture the actinomycete had the following characteristics: The aerial mycelium is long, thin and very branched and forms spirals. The aerial mycelium has a pinkish-gray color. Spiral sporophores leave the aerial hypha and carry unicellular conidia of slightly elongated cylindrical form which is .7 to .9 micron in height and .6 to 7 microns in diameter. At a temperature between 28° C. and 30° C., maximum development was obtained.

This microorganism named *Streptomyces gabonae* strain Aubriot 272, presents the following characteristic cultures on various culture media:

*Gelatine.*—Important culture with production of a brown pigment and accompanied by liquefaction of the gelatine.

*Glucose-asparagine-agar-agar.*—Slow culture pinkish grey with red portions. Some colonies have a projecting white crown.

*Glucose broth.*—Grey and white isolated colonies on a surface of liquid medium, with pink coloration of the cultured juice.

*Potato medium.*—Very rapid culture. The mycelium is very fine, yellowish grey, with reddish grey border areas. The liberally spread out colonies are crinkled. The grey pigment becomes chestnut as it ages, and diffuses over the surface of the medium.

*Medium having an agar-agar and starch base.*—The nitrogen source is brought into this medium by hydrolyzates of casein. Hydrolysis of the starch can be shown when it is added in small quantities. On this medium the conidia changes are more open and have fewer conidia on each sporophere.

As already indicated the new antibiotic DX27 is produced by submerged aerobic culture of *Streptomyces gabonae* sp. Aubriot 272. The culture is obtained by sowing a liquid medium of the usual type such as maize, yeast proteolyzates or whole yeasts with spores or a pre-culture of *Streptomyces gabonae* and maintaining aerobiosis at a tmperature of about 23° C. for ten to twenty days and at a pH between 7 and 8. The culture medium may be one of those known for growing the already isolated numerous streptomyces. It contains a source of carbohydrate which can be assimilated such as arabinose, d-galactose, maltose and other suitable sugars, a protein and/or amino acid or amino acid proteolyzate, mineral salts and the required growth factors such as vitamins and metabolites. Soya products are particularly suitable as the source of nitrogen. The extraction of DX27 is effected after elimination of the mycelium and acidification to pH 4 by counterflow extraction with n-butanol. The butanol solution can be fractionated at this initial stage and then subjected to extraction with distilled water after alkalinization with N alcoholic soda. The aqueous phase is concentrated after slight acidification to pH 6.5 by passage of "Amberlite" or other column of basic ion exchange resin followed by subsequent washing out with alcoholic soda. The neutralized alcoholic solution obtained is concentrated in vacuo and reduced to one-tenth its initial volume by absolute alcohol, 12 volumes of acetone being added and the solution being cooled to −10° C. whereupon the DX27 is precipitated.

The invention is illustrated by the following non-limitative examples.

*Example 1*

The inoculation substance (inoculum) is formed of spores from cultures on nutrient agar-agar combined with the streptomyces strain Aubriot 272 mentioned above.

The nutrient medium receiving these spores, as contained in Roux phials, is composed of:

| | Percent |
|---|---|
| Glucose | 1.000 |
| Soya flour | 1.500 |
| Enzymatic meat proteolyzate | 1.000 |
| Liver proteolyzate | 0.250 |
| Sodium chloride | 1.000 |
| Fresh meat juice | 0.300 |
| Anti-foaming agent | 0.001 |

Distilled water, 100 ml.

The phials primed in the liquid mass are placed at 28° C. on a shaker machine.

After thirty-six to forty-eight hours fully developed cultures are used to prime the culture medium proper composed of:

| | Percent |
|---|---|
| Glucose | 2.500 |
| Sodium chloride | 0.300 |
| Soya flour | 4.000 |
| Soya oil | 1.000 |
| Distillery worts | 1.000 |
| Anti-foaming agent | 0.010 |

This composition is contained in a fermentation vat maintained at 28° C. for sixty-four hours and ventilated with a current of air at a rate of 0.65 m.$^3$ per minute.

After this time, the antibiotic is present in a concentration of 1050 mcg. per ml. After filtration of the mycelium, the DX27 is extracted and purified by applying the chemical properties which are associated with it; 100 liters of juice are acidified and extracted in the counterflow by n-butanol. The butanol fractions are collected separately and test samples are mixed bacteriologically in order to learn the antibiotic concentration.

After the more concentrated fractions are united, a volume of approximately 200 to 250 liters is obtained.

After the concentration of organic acid has been determined by test mixing, 1.5 times the quantity of soda necessary for neutralization is added and an extraction is obtained from two amounts of 20 liters of water, in all a total of 40 liters. After slight acidification with a pH 6.2 to 6.5 with hydrochloric acid, the solution is passed over a basic Dowex 2 resin column which is subsequently washed out with 5 liters of ethyl soda alcohol. After neutralization with sulfuric acid, the sulfate of soda formed is precipitated, eliminated and then concentrated in vacuo. The residue obtained is crystallized in the cold in the methyl butyl ketone.

*Yield.*—The product obtained corresponds to the activity of 71 milligrams of pure crystallized DX27.

*Example 2*

The inoculum prepared as in Example 1 is used to prime the following industrial culture:

18 kgs. of glucose
11 kgs. of soya oil
19 kgs. of beef hydrolyzate
5 kgs. of sodium chloride
1 kg. of calcium carbonate
2 kgs. 500 of potassium chloride
0 kg. 100 of oil of lard
1.800 liters of water.

The fermenter apparatus is provided with an agitator revolving at 300 r.p.m. and a crown-shaped intake of compressed air to agitate and ventilate the content at a rate of 5,000 liters of air per minute. The pH is adjusted to 6.5.

After sterilization at 125° C. for one hour and thirty minutes the medium is inoculated with spores of *Streptomyces gabonae* sp. Aubroit 272 then kept at 24° C. for 118 hours.

After forty hours each millimeter of culture tested for staphylococcus, represents the activity of 250 mcg. of crystallized DX27. After 118 hours the concentration reaches 790 mcg./ml.

After filtration of the culture juice and acidification by hydrochloric acid to pH 4 the active principles are fixed on an ion exchanger column from which they are washed out by water with a pH 9.

After decoloration with active carbon at the rate of 1 to 100 of the liquid medium the medium is acidified to pH 2 and extracted with propyl alcohol. This alcohol is distilled in vacuo down to one-tenth of the initial volume.

After filtration of insoluble medium, the alcohol is mixed with acetone and the organic acids present neutralized with anhydrous soda in solution in propanol. For this purpose a test is titrated with N/10 aqueous soda until the phenol phthalein begins to turn. Thus, the quantity of soda to be added is determined exactly so that neutralization takes place in the organic medium without excess.

In these conditions, crystallization takes place after twenty-four hours at −5° C. The precipitation obtained is dissolved in water and neutralized to pH 7.5 by titrated soda. After sterilizing, filtration and lyophilization the compound obtained is in its stable form of use.

*Yield.*—The activity contained in the dried product corresponds to that of 58 milligrams of pure crystallized DX27 per 100 liters of cultured juice. The total weight obtained is 125 milligrams.

What is claimed is:

1. A process of producing the antibiotic DX27 which comprises inoculating a nutrient medium with *Streptomyces gabonae* sp. Aubriot 272 (ATCC accession No. 15,282), aerobically cultivating the inoculated nutrient medium at a temperature of 28° C. to 30° C. for 50 to 118 hours and separating the antibiotic thus produced from the culture medium.

2. A process according to claim 1 in which the cultivation is carried out in the submerged state and an aqueous nutrient medium is employed which contains a proteinaceous material and a source of assimilable carbon.

3. A process according to claim 1 in which the nutrient medium is composed of glucose, soya flour, enzymatic meat proteolyzate, liver proteolyzate, sodium chloride, fresh meat juice, anti-foaming agent and distilled water.

4. The antibiotic DX27, a basic chemical compound of empirical formula $C_{32}H_{41}O_6N_2S$ melting at 212° C. to 215° C. in the crystalline state and having a molecular weight of about 590, and further characterized by an optical rotation in benzene of about $(\alpha)j=72°$, ultraviolet absorption maxima at 210 and 360 m$\mu$ in a sodium phosphate buffer solution of pH 7.8, a positive biuret test for polypeptidic linkage, a negative ninhydrin test for $\alpha$-amino acid, a negative Fehling test for aldehydic carbohydrates, and possessing antibiotic activity against *Streptococcus hemolyticus, Escherichia coli, Salmonella paratyphi* B, *Staphylococcus albus, Staphylococcus aureus, Klebsiella pneumoniae, Mycobacterium tuberculosis* and foot and mouth disease virus, said antibiotic being soluble in aqueous alkali, slightly soluble in water of pH 6 at 70° C. and soluble in $C_4$ to $C_8$ aliphatic alcohols in its non-salt acid form, extractable by n-butanol in its acid form and soluble in methanol in alkali salt form, said antibiotic being produced by the process of claim 1.

No references cited.

ALBERT T. MEYERS, *Primary Examiner.*

SAM ROSEN, *Examiner.*